United States Patent [19]

Lemoigne

[11] 4,209,148
[45] Jun. 24, 1980

[54] FLYING WING

[76] Inventor: Pierre M. Lemoigne, 103, Avenue Verdier, 92120 Montrouge, France

[21] Appl. No.: 866,617

[22] Filed: Jan. 3, 1978

[30] Foreign Application Priority Data

Jan. 5, 1977 [FR] France .............................. 77 00165

[51] Int. Cl.² .......................................... B64C 31/00
[52] U.S. Cl. ..................................... 244/16; 244/152; 244/DIG. 1
[58] Field of Search .................. 244/13, 16, 145, 152, 244/153 R, DIG. 1, 154, 204

[56] References Cited

U.S. PATENT DOCUMENTS

| 3,289,976 | 12/1966 | Lemoigne | 244/16 |
| 3,428,277 | 2/1969 | Everett, Jr. | 244/DIG. 1 |
| 3,508,726 | 4/1970 | Lemoigne | 244/204 |
| 3,863,868 | 2/1975 | Oberle | 244/16 |

FOREIGN PATENT DOCUMENTS 1546780 11/1968 France .............................. 244/DIG. 1

*Primary Examiner*—Galen L. Barefoot
*Attorney, Agent, or Firm*—Irons and Sears

[57] ABSTRACT

The flying wing comprises a rigid frame and a fabric canopy secured to the frame. The canopy has propelling, braking and steering hyperlift nozzles arranged on the surface of the canopy for canalizing the flow of air rearwardly from the under side to the upper side of the canopy. A support device for the pilot comprises at least two rigid members connected to the frame and extending downwardly from the frame and terminating in a seat for the pilot. Members maintain the rigid members stationary relative to the frame. The canopy has a longitudinal intermediate strip held planar by the frame and two relatively flexible substantially triangular lateral portions on laterally opposite sides of the strip and connected to the latter. The canopy has in plan substantially the shape of an isosceles trapezium the small base of which defines the leading edge of the wing. The intermediate strip has one of the aforementioned nozzles and each of the two lateral portions has two of the aforementioned nozzles.

3 Claims, 9 Drawing Figures

U.S. Patent  Jun. 24, 1980  Sheet 1 of 2  4,209,148
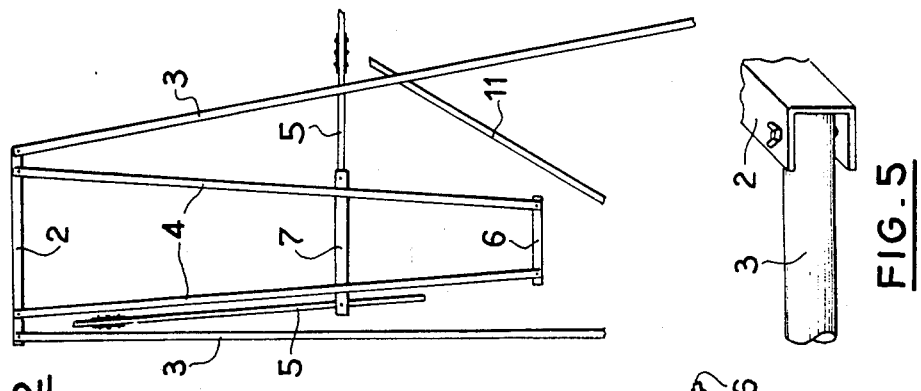
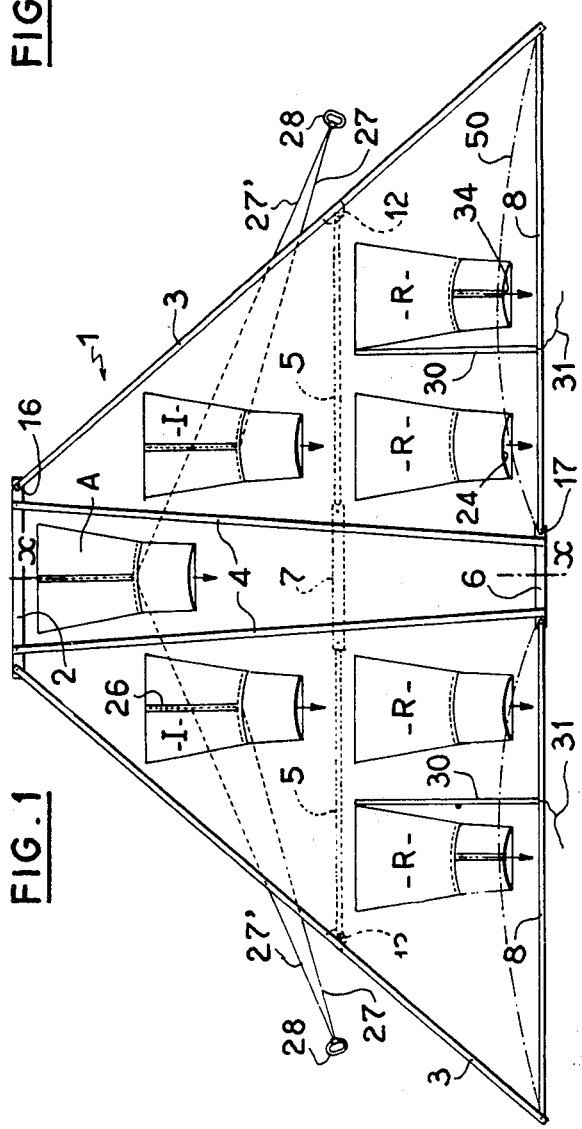
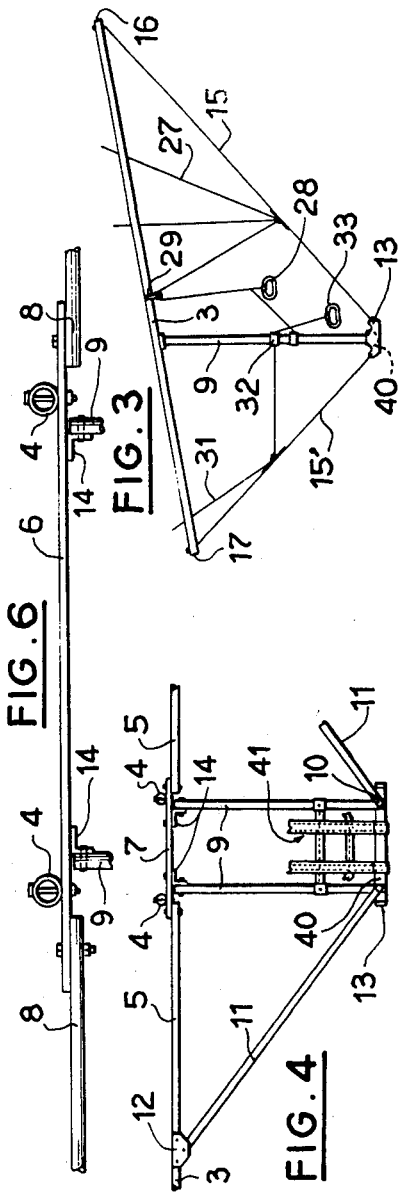

U.S. Patent  Jun. 24, 1980  Sheet 2 of 2  4,209,148
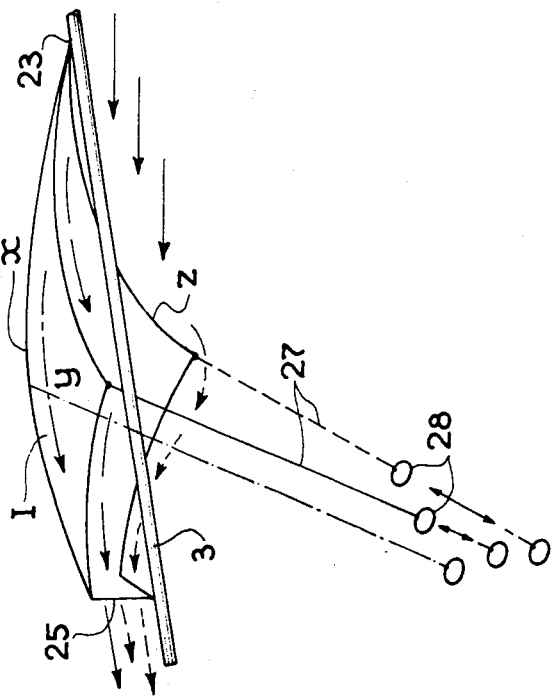
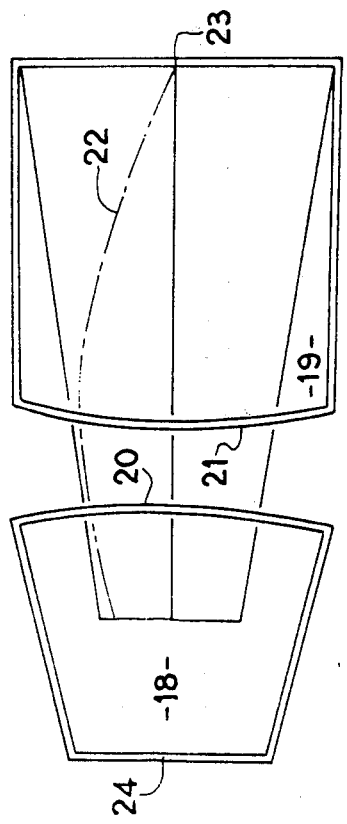
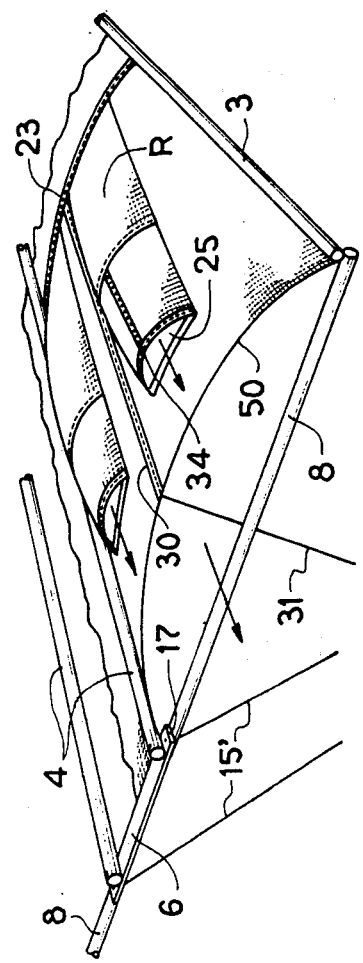

FLYING WING

The present invention relates to flying wings employed for "free flying".

Free flying, which consists in piloting a delta glider or sail plane, that is to say a part-conical delta or Rogallo wing or the like, has recently undergone a considerable development which may be rightly considered as premature and dangerously rapid since the reactions of flying wings of this type in this type of application are still not well understood.

Indeed, notwithstanding the fact that the properties of delta type wings are well known to designers and those skilled in the art in their application to aircraft, these wings had heretofore been employed as non-piloted gliders only for bringing heavy inert loads down to the ground.

In this application, the load is suspended from a precise point below the wing and thus ensures a centering and an absolutely constant angle of pitch or incidence whereby the wing behaves in the manner of a parachute having a gliding canopy.

A wing of this type which comprises a rigid frame on which a canopy for example of fabric is held taut and is devoid of controlling surfaces when used as a piloted glider requires, in order to pilot the wing, acting on the angle of pitch or incidence and the inclination of the lateral axis or roll of the canopy. For this purpose, the pilot who is suspended freely under the canopy, acts on a trapeze which is connected to the front end and the rear end of the frame so as to modify the angle of pitch and/or the inclination of the lateral axis.

Consequently, the weight of the pilot is displaced forwardly or rearwardly or laterally and thus modifies the centering and the balance.

It is well known to those skilled in the art that delta wings have many drawbacks at low speeds, namely poor stability and high sensitivity to the angle of pitch which must be large. Although it is easy to overcome these drawbacks in aircraft, this is not the case for a delta wing of light construction employed as a piloted glider or sail plane.

Under these conditions, the piloting of a delta wing of the aforementioned type is extremely delicate and the wings employed for free flying do not have in the present state of the art sufficient properties of stability and are dangerous even in the hands of experienced pilots and the many accidents which have occurred in the last few years show the need for a more developed machine which is provided with means imparting thereto a perfect stability under all flying conditions and is free from sudden reactions which are liable to surprise the pilot and cause him to lose control of the machine.

Belgian Patent No. 671,479 and French Patent No. 1,383,036 to the Applicant disclose glider structures employing nozzles in the canopy of the glider in an unsuccessful attempt to improve the stability. Belgian Patent No. 828,102 to Bombaert discloses a glider structure in which the pilot is suspended freely under the canopy on which no nozzles are employed.

An object of the present invention is to overcome the drawbacks of delta gliders at present employed for free flying by providing a pilotable flying wing which has a very high longitudinal and lateral stability, a roughly constant angle of pitch and centering and whose canopy cannot flap and which is also stable in turns and whose speed may be slowed down, that is to say a flying wing which has a high coefficient of safety.

The invention provides a flying wing for use in piloted free flight comprising a rigid frame having a longitudinal axis, a canopy secured to said frame and support means connected to said frame for carrying the pilot, the canopy having propelling, braking and steering hyperlift means comprising a plurality of nozzles arranged on the surface of a canopy for canalizing the flow of the air rearwardly of the canopy from the underside of the canopy to the upper side thereof, said support means comprising at least two rigid members connected to said frame and extending downwardly from the frame, means for holding said members stationary relative to said frame and a seat carried by said members, the canopy comprising a longitudinal extending intermediate strip maintained substantially planar and two relatively flexible substantially triangular lateral portions located on laterally opposite sides of and connected to the intermediate strip, the canopy having in plan the shape of an isosceles trapezium the small base of which defines a leading edge of the canopy, said intermediate strip comprising one of said nozzles and each of said lateral portions comprising at least two of said nozzles, the canopy having a trailing edge opposed to said leading edge.

According to a preferred embodiment of the invention, the nozzles are of the balloon type of nozzle capable of producing a Venturi effect, control lines being connected to some of these nozzles so as to enable the pilot to vary their profile in flight.

According to another feature of the invention, the canopy comprises a front nozzle, two intermediate nozzles and four rear nozzles.

Further features and advantages of the invention will be apparent from the ensuing description with reference to the accompanying drawings, which are given merely by way of example and in which:

FIG. 1 is a top plan view of the flying wing according to the invention;

FIG. 2 is a view of the members of the frame of the wing before assembly thereof;

FIG. 3 is a diagrammatic side elevational view of the wing according to the invention showing the arrangement of the controls and of the support device carrying the pilot;

FIG. 4 is a partial rear elevational view showing the arrangement of the members of the frame carrying the pilot;

FIG. 5 is a partial view of an embodiment of the pivotal assembly of a member of the frame with the front cross-member of the latter;

FIG. 6 is a partial view of an embodiment of the attachment of members of the frame to the rear cross-member;

FIG. 7 is a view of a nozzle which is developed in plan, and of the arrangement and profile thereof;

FIG. 8 is a partial view of the trailing edge of the canopy of the wing according to the invention, showing the arrangement of a nozzle and the steering control, and FIG. 9 is a partial diagrammatic side elevational view of three different profiles of a nozzle, which may be obtained by the pilot by acting on control lines.

With reference to the drawings and more particularly to FIG. 1, the flying wing according to the invention, generally designated by the reference numeral 1, comprises a rigid frame, which may advantageously consist of tubes, bars, rods or other section members which are of light alloy or some other suitable material and has in plan the shape of an isosceles trapezium the small base of which constitutes the leading edge 2 which is, for example, formed by a U-section member of aluminium. Pivotally connected adjacent each end of this member between the flanges of the latter are a side member 3 and, slightly set back relative to the ends and between the members 3, two intermediate longitudinal members 4 which are shorter than the members 3.

The side members 3 extend rearwardly from the front cross-member 2 in a divergent manner and the intermediate members 4 also extend rearwardly but in a convergent manner and between the members 3.

The members 4 are connected at their opposite end by a rear cross-member 6, shorter than the member 2, and between their ends, by an intermediate cross-member 7.

Two intermediate cross-members 5 are connected to the ends of the intermediate member 7 and extend laterally on each side of the longitudinal axis X—X of the wing toward the side members 3 to which they are connected, through a bracket means 12. Two further rear cross-members 8 are connected, on one hand, to the ends of member 6 and, on the other hand, to the rear ends of side members 3.

In the same way as the front member 2, the members 7 and 6 advantageously consist of light alloy bars or section members.

The frame of the wing is completed by two substantially vertical rigid members 9 which are each connected by one end thereof in the vicinity of an end of the intermediate cross-member 7 through a corner 14 and connected by the opposite ends thereof, as shown at 10 in FIG. 4, to outwardly extending rigid members 11 which are connected at the opposite ends by means of the brackets 12 to the outer ends of the elements 5 and consequently also to the members 3.

The lower ends of the members 9 are each provided with a stirrup 13 in which are fixed the ends of a cross-member 40 constituting a seat, and a conventional parachute harness 41 is shown partly and is secured to the vertical members 9 and to the cross-member 40 in a suitable manner to maintain the body of a pilot seated on the cross-member between the members 9.

In order to ensure a constant position of the frame of the wing relative to the seat 40 when the members 9 are vertical, or, in other words, in order to ensure a constant angle of incidence of the wing relative to the vertical, when the pilot is seated on the seat in the harness and the assembly is viewed in side elevation (FIG. 3), a cable 15 is anchored in the vicinity of each end of the seat 40 on the respective stirrup 13, the cables 15 being connected at their opposite ends to the pivotal connection 16 of the corresponding member 3 to the front cross-member 2. Likewise, two cables 15' connect the ends of the seat 40 to the ends of the cross-member 6 at 17.

It will therefore be understood that the seat-harness unit is connected at two spaced-apart points of the trailing edge and at two spaced-apart points of the leading edge, respectively to the rear of and in front of the vertical members 9 carrying the seat. It will be understood that, with this arrangement, when the members 9 are maintained vertical by the weight of the pilot, the frame of the wing has an angle of incidence or pitch which is maintained constant.

The canopy of the wing which is made from any fabric of suitable strength, is secured to the frame by tubular sleeves (not shown) through which the members 3 and 4 of the frame extend, and is held taut and planar in an intermediate longitudinal strip between the members 4, the latter being preferably disposed on the extrados or upper side of the canopy, the parts of the canopy between members 3 and 4 on each side of said strip forming two substantially triangular lateral portions, the surface of each of which is somewhat larger than the triangular surface bounded by the members 3,8,4, and the trailing edge 50 of each of these lateral portions of the canopy being free, so that these portions can bow in flight under the pressure of the air, on opposite sides of said planar intermediate taut strip.

This canopy comprises a plurality of balloon nozzles forming a Venturi, the construction of which is shown in FIG. 7.

The nozzles are all identical in their construction and only one thereof need be described. Each nozzle comprises two pieces of fabric 18, 19 of substantially trapezoidal shape, each having a convex edge 20, 21 as shown in plan in FIG. 7. The edges 20 and 21 are firmly stitched together, this stitching being preferably reinforced by a tape or band in a manner similar to that employed in the construction of nozzles employed on many parachutes.

With the pieces of fabric 18 and 19 interconnected, the nozzle has in projection substantially the general shape of an isosceles trapezium as shown diagrammatically in FIG. 1, and it has in longitudinal section the shape shown by the dotted line 22 in FIG. 7. The leading edge 23 of the nozzle is stitched to the extrados or upper side of the canopy and the nozzle is secured to the latter by its lateral edges on the lateral edges of a corresponding opening cut in the canopy, the rear end 24 of the nozzle defining above the upper side of the canopy an opening 25 for the outlet of the air (FIG. 8).

The canopy comprises a front nozzle A, disposed in a central position in the middle of the leading edge, two intermediate nozzles I disposed on each side of the nozzle A and slightly to the rear of the latter, and four rear nozzles R disposed in a row and terminating in the vicinity of the trailing edge.

The intermediate nozzles I each have a longitudinal stitched reinforcing tape or band 26 extending between the leading edge and their intermediate transverse stitching and a cable 27 (FIG. 3) is secured at the point of junction between this tape and stitching and is connected to an actuating handle 28 which is maintained within reach of the pilot in the vicinity of his hands, for example by means of a support 29 fixed to the member 9 of the frame and through one end of which the halyard or line 27 slides.

The nozzles are actuated in the following manner:

These nozzles are of the balloon type forming a Venturi. Their arrangement on the canopy canalizes and accelerates the rearward flow of the air from the under side or intrados of the canopy toward the upper side or extrados and produces a hyperlifting effect and apply to the wing a forward horizontal displacement component.

Further, the front nozzle A disposed in the planar part of the canopy between the members 4 performing the same function as the safety slots or "bec" on aircraft wings, precludes any tendency on the part of the wing to dive and thereby imparts to this wing a very high longitudinal stability.

The intermediate nozzles I, which are connected to the actuating handles 28 by the lines or halyards 27 may produce a propelling effect. With reference to FIG. 9, x designates the profile of the nozzle in normal operation, inflated by the flow of the air. The line y in full line shows the profile of the nozzle when the pilot exerts a pull on the handle 28. When such an action is exerted by the pilot simultaneously on the two intermediate nozzles I, the latter bear against the air and thereby temporarily throttle the flow of the air and, when the pilot releases the pull on the handles 28, this nozzle resumes its initial shape x under the action of the pressure of the air and thereby suddenly accelerates the flow of the latter which temporarily reinforces the normal propelling action of the nozzles.

The full line Z represents the profile of the nozzles when the pilot exerts on the handles 28 a pull sufficient to bring the whole of the nozzles below the plane of the frame. This position of the nozzles exerts an energetic slowing down effect achieved by an elevation of the wing.

The rear nozzles R also have an hyperlifting, propelling and canalizing action on the flow of the air ensuring that the wing has a highly stable trajectory.

Moreover, a band or tape 30 is fixed perpendicular to the trailing edge of the canopy between the two nozzles of each rear lateral pair and a cable 31 is secured to the point of junction between the band 30 and the trailing edge, these cables 31 being slidably mounted for example in supports 32 also fixed to the member 9 of the frame in the vicinity of the shoulders of the pilot and each terminating in an actuating handle 33.

The wing is thus steered by the cables 31 on which the pilot can exert a pull so as to lower the trailing edge of the canopy and thereby increase the drag on this side as shown in full line in FIG. 8. As the drag is in this way increased on only one side of the canopy, the wing tends to turn toward this side. The pilot can in this way steer the wing by means of the handles 32.

It will be observed that, if desired, an additional cable 27' may be secured to each handle 28, these two cables being joined in the middle of the front nozzle A. In this way, this nozzle A may also be used for producing a propelling effect which is added to that produced by the movements of the intermediate nozzles I.

If desired, it is also possible to employ the outlet of one or both of the rear lateral nozzles on each side of the wing to steer the latter, the cable 31 being then secured to the trailing edge of a nozzle as shown at 34 in FIG. 1.

It will be observed that, owing to the fact that the canopy is maintained by the members 3 and 4 of the frame which extend through sleeves of the canopy but is not maintained along the trailing edge thereof, this canopy tends to assume in flight a suitably bowed or curved shape at the trailing edge while remaining planar in the centre part thereof, which contributes towards its stability in flight.

It will be immediately clear to those skilled in the art that the presence and the action of the front nozzle A in combination with the constant angle of pitch or incidence of the wing and with the hyperlifting effect and the forward displacement component produced by the other nozzles, imparts to the flying wing according to the invention high stability, in particular in the longitudinal direction which precludes the flapping of the canopy which occurs in the known delta gliders having small angles of pitch or incidence which are difficult to control.

It will also be observed that, owing to the arrangement of the members 9, 11 and the cables 15, 15' which together define an inverted pyramid, the seat carrying the pilot is maintained below a given point of the canopy ensuring an invariable centering at the same time as the constant angle of pitch or incidence of the wing, as mentioned before.

Consequently, in contrast to known delta wings or gliders, the pilot tends, by his own weight applied at a given point, to maintain a constant angle of pitch of the wing and controls the movements of the wing by actions exerted on the nozzles and the canopy, whereas, in the known delta gliders, the sole possibility of a control action on the part of the pilot consists in varying the centering by displacing the weight of his body relative to the wing or by modifying his position.

The maintenance of a constant angle of pitch also permits satisfying the requirements of this form of canopy, namely a high angle of pitch for low speeds.

Lastly, the properties of the flying wing according to the invention are such that this wing, when released in space in a flying position from a fixed point, will firstly behave like a parachute and will have a decreasing fall as the pressure of the air on the under side will give rise, owing to the nozzles, to a horizontal displacement component, and will then finally reach its normal flying speed.

Having now described my invention, what I claim as new and desire to secure by Letters Patent is:

1. A flying wing for use in piloted free flight, of the kind comprising a rigid frame means of trapezium form having a longitudinal axis and on which is secured a canopy made of fabric provided with propelling, braking and steering nozzle means for canalising the flow of air rearwardly from the underside to the upper side of the canopy, and downwardly extending rigid support means for carrying the pilot, wherein said frame comprises a leading edge member, a substantially longitudinal member and a lateral member extending rearwardly from each end of said leading edge member in a diverging fashion on each side of said longitudinal axis, the ends of said longitudinal members opposite to said leading edge member being connected by a first rear cross member and the rear ends of said lateral members being connected by second rear cross members respectively to the corresponding ends of said longitudinal members, said second rear cross members defining each with one longitudinal member and one lateral member substantially triangular portions on either side of an intermediate longitudinally extending strip defined therebetween by said longitudinal members and said leading edge and rear cross members, so that the whole frame means forms a rigid isosceles trapezium frame of which the small base is the leading edge and the large base the trailing edge of the wing, the fabric of the canopy being secured and taut on said frame with the exception of its trailing edge along said rear cross members, said nozzle means of the canopy comprising one front nozzle, a row of four rear nozzles adjacent the trailing edge and two intermediate nozzles located substantially between said front nozzle and said row of rear nozzles.

2. A flying wing as claimed in claim 1, wherein the said front nozzle is positioned adjacent said leading edge member in said strip, the rear nozzles and the intermediate nozzles being positioned in said substantially triangular lateral portions.

3. A flying wing as claimed in claim 1 or 2, wherein at least one intermediate cross member parallel to said leading edge member pivotally interconnects said lateral and longitudinal members at a given point of the depth of the wing, said support means carrying the pilot comprising two rigid members fixed by one end thereof to said intermediate cross member and thereby to said longitudinal members.

* * * * *